No. 631,794. Patented Aug. 29, 1899.
E. F. ISGRIG.
MOWING MACHINE ATTACHMENT OR HAY GATHERER.
(Application filed June 2, 1899.)
(No Model.) 2 Sheets—Sheet 1.
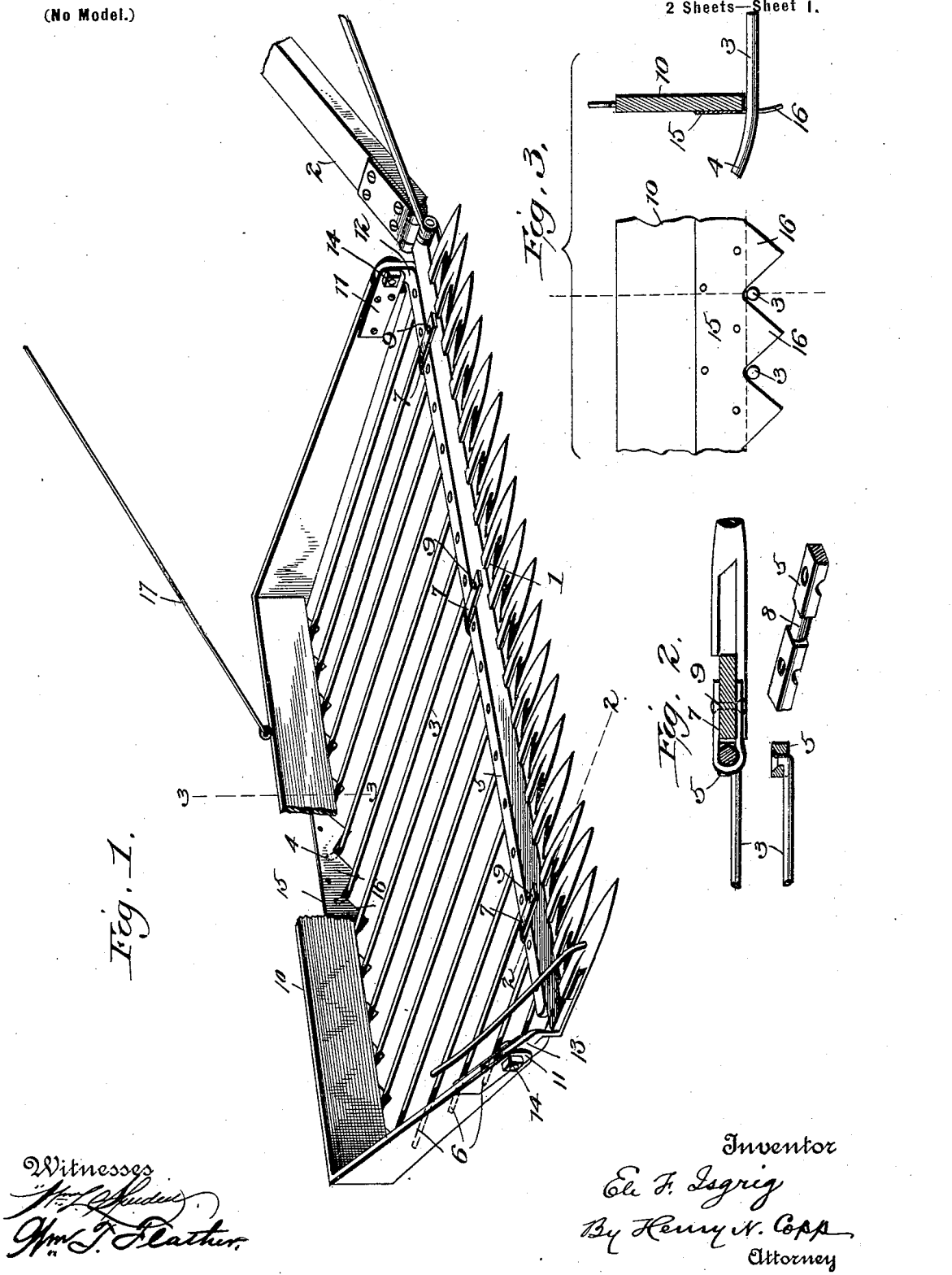
Witnesses
Inventor
Eli F. Isgrig
By Henry N. Copp
Attorney No. 631,794. Patented Aug. 29, 1899.
E. F. ISGRIG.
MOWING MACHINE ATTACHMENT OR HAY GATHERER.
(Application filed June 2, 1899.)
(No Model.) 2 Sheets—Sheet 2.
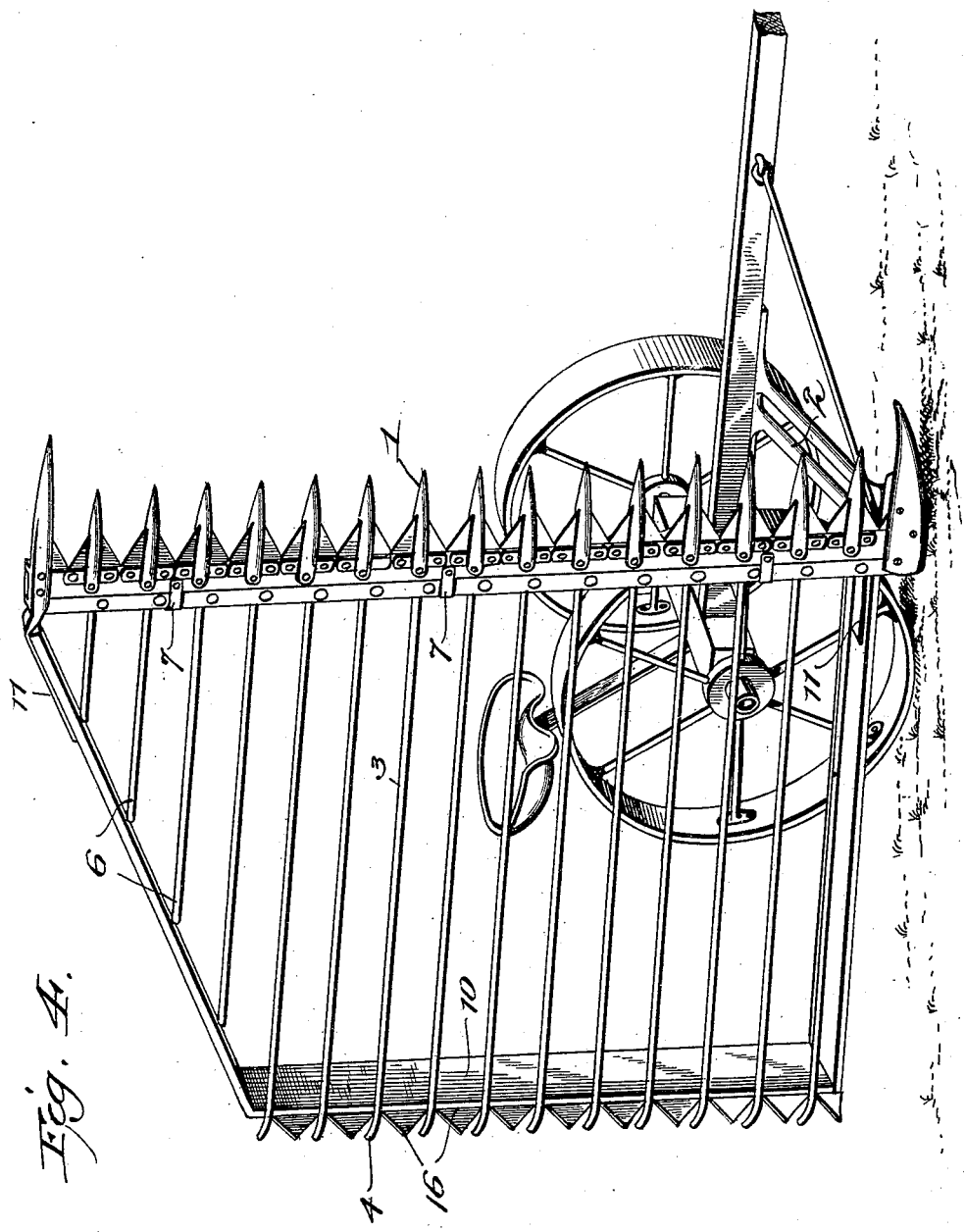
Witnesses
Inventor
Eli F. Isgrig
By Henry M. Copp
Attorney

UNITED STATES PATENT OFFICE.

ELI F. ISGRIG, OF PIERRE, SOUTH DAKOTA, ASSIGNOR OF ONE-HALF TO DAVID S. HOOPER AND L. E. ISGRIG, OF SAME PLACE.

MOWING-MACHINE ATTACHMENT OR HAY-GATHERER.

SPECIFICATION forming part of Letters Patent No. 631,794, dated August 29, 1899.

Application filed June 2, 1899. Serial No. 719,063. (No model.)

*To all whom it may concern:*

Be it known that I, ELI F. ISGRIG, a citizen of the United States, residing at Pierre, in the county of Hughes and State of South Dakota, have invented certain new and useful Improvements in Mowing-Machine Attachments or Hay-Gatherers; and I do hereby declare the following to be a full, clear, and exact description of the invention, such as will enable others skilled in the art to which it appertains to make and use the same.

My invention relates to hay gatherers or catchers for mowing-machines.

The object of the present invention is the provision of an improved attachment constructed and positioned to gather or catch the grass or hay after cutting and adapted for manipulation to drop it after a suitable quantity is obtained, whereby the hay or grass can be laid in windrows on the field, thereby facilitating its removal and obviating the necessity of using a horse-rake.

A further object is to provide a hay-gatherer which can be swung up with the finger-bar of the machine, so as to be out of the way when the machine is traveling on the road or from one field to another.

The invention is particularly intended for use in those sections of the country where the grass dries quickly while standing, so that it is ready for removal as soon as cut by the mowing-machine.

Having the foregoing objects in view, the invention consists of certain improved features and novel combinations of parts fully described hereinafter and particularly pointed out in the appended claims.

In the accompanying drawings, Figure 1 is a perspective showing the device applied to the finger-bar of a mowing-machine; Figs. 2 and 3, detail views, and Fig. 4 a view showing the finger-bar and its attached hay-gatherer in raised position.

The numeral 1 designates a finger-bar, and 2 a portion of the frame, of an ordinary mowing-machine.

There is a frame composed of a plurality of parallel rods or slats 3, having their rear ends 4 turned upwardly, and a cross-piece 5, to which the slats are connected at their front ends. The outermost slats 6 of the series are made shorter than the others for a purpose which will appear presently. The cross-piece 5 is hinged to the finger-bar by a suitable number of hinge-loops 7, which lie in grooves 8 in the said cross-piece and have their ends straddling the finger-bar and fastened thereto by bolts 9.

The numeral 10 designates a catcher made in the shape of a frame composed of a rear or end piece and side pieces, the latter having hinge-straps 11, one set of which straddles an upward extension 12 on cross-piece 5 and the other set straddling a rearward extension 13 on the outer end of the finger, and said hinge-straps are pivoted to the aforesaid extensions by bolts 14. It will be observed that the outermost side piece of the frame is inclined, and this is why the outermost slats are made shorter. This inclination causes the cut grass or hay to pack or accumulate better on the slats than it would if both sides of the frame were made to extend directly rearward. The rear piece of the frame has a strip 15, provided with teeth 16, which are positioned to fit in the spaces between the slats of the rack immediately in front of the curved ends 4, said teeth effectually preventing the cut material on the rack or frame from slipping out before dumping or dropping. The curved ends of the slats permit the backing of the machine without interference.

The numeral 17 represents a cord or rope connected to the gathering or catching frame, by means of which it can be lifted by the driver of the machine.

The manner of attaching the invention to the finger-bar permits it to be swung upwardly with the bar when the latter is raised to assume a vertical position, as when traveling on the road or from one field to another, so that it is out of the way.

The operation is as follows: The grass or hay after being cut by the knives passes back onto the slats, on which it is made to accumulate by the catcher-frame. When a sufficient quantity has been caught, the driver lifts the frame and the accumulation is dropped, so that windrows can be laid all over the field, which facilitates harvesting.

Having thus described my invention, what I claim as new, and desire to secure by Letters Patent, is—

1. In a device of the class described, the combination with a finger-bar having an extension, of a rack or frame comprising a cross-piece connected to the finger-bar and rods or slats connected to and extending rearwardly from the cross-piece, said cross-piece having an extension, and a catcher or gatherer frame adapted to rest on the rack and having its forward portions pivoted to the extensions.

2. In a device of the class described, the combination with a finger-bar and a rack or frame connected thereto, which is composed of rods or slats, of a movable catching-frame resting on the rack and provided with teeth fitting in the spaces between the slats.

3. In a device of the class described, the combination with a finger-bar and a rack or frame connected thereto, which is composed of separated rods or slats having their rear ends turned upwardly, of a hinged gathering or catching frame resting on the rack and provided with teeth fitting in the spaces between the slats or rods immediately in front of the curved ends of the same.

In testimony whereof I affix my signature in presence of two witnesses.

ELI F. ISGRIG.

Witnesses:
ALBERT GUNDERSON,
M. T. GUNDERSON.